US005389183A

United States Patent [19]

Seki et al.

[11] Patent Number: 5,389,183

[45] Date of Patent: Feb. 14, 1995

[54] SINGLE-FACER

[75] Inventors: Yukuharu Seki; Makoto Ando, both of Mihara, Japan

[73] Assignee: Mitsubishi Jukogyo Kabushiki Kaisha, Tokyo, Japan

[21] Appl. No.: 65,389

[22] Filed: May 21, 1993

[30] Foreign Application Priority Data

Jun. 5, 1992 [JP] Japan ................................ 4-169855

[51] Int. Cl.[6] ......................... B32B 31/08; B31F 1/28

[52] U.S. Cl. .................................. 156/359; 156/210; 156/64; 156/378; 156/472

[58] Field of Search ............... 156/472, 471, 470, 205, 156/210, 378, 359, 64; 425/369, 336

[56] References Cited

U.S. PATENT DOCUMENTS

| | | | |
|---|---|---|---|
| Re. 22,842 | 2/1947 | Hill | 156/470 X |
| 2,589,966 | 3/1952 | Rullo | 156/472 X |
| 2,638,962 | 5/1953 | Nitchie | 156/473 |
| 2,793,674 | 5/1957 | Reinhard | 156/471 X |
| 3,053,309 | 9/1962 | Wilson et al. | 156/471 |
| 3,630,806 | 12/1971 | Kitajima | 156/472 |
| 3,676,247 | 7/1972 | Morris et al. | 156/471 X |
| 3,811,987 | 5/1974 | Wilkinson et al. | 156/471 X |
| 3,920,496 | 11/1975 | Wilkinson et al. | 156/210 X |
| 4,481,066 | 11/1984 | Hirakawa et al. | 156/472 |
| 4,556,444 | 12/1985 | Schommlee | 156/359 |

FOREIGN PATENT DOCUMENTS

| | | |
|---|---|---|
| 0024817 | 3/1981 | European Pat. Off. . |
| 0492310 | 7/1992 | European Pat. Off. . |
| 0492310 | 7/1992 | European Pat. Off. . |
| 2142591 | 2/1973 | France . |
| 1011274 | 6/1957 | Germany . |
| 2527819 | 12/1976 | Germany . |

OTHER PUBLICATIONS

European Search Report, The Hague, completed Apr. 6, 1992.

*Primary Examiner*—Caleb Weston
*Assistant Examiner*—Michele K. Yoder
*Attorney, Agent, or Firm*—Rothwell, Figg, Ernst & Kurz

[57] ABSTRACT

The present invention reduces damages in a single-facer expected when foreign matters are bitten between a downstream side corrugating roll and an upstream side corrugating roll, achieves effective utilization of a peripheral space, and also improves a bonding strength between a core paper web and a corrugated paper web by maintaining a temperature of a single-faced cardboard sheet constant.

A downstream side corrugating roll and an upstream side corrugating roll are formed in such manner that a pitch circle diameter of the downstream side corrugating roll may be larger than a pitch circle diameter of the upstream side corrugating roll and the ratio of the diameter of the downstream side corrugating roll to the diameter of the upstream side corrugating roll may be a predetermined integer ratio. Even in the event that a foreign matter such as a bolt has been bitten between the respective corrugating rolls, damages occurring on the both corrugating rolls are limited to a number of locations, and so, great reduction of a repair time can be realized. In addition, at least either one of a pressing force and a wrapping angle of an endless belt is regulated by detecting a surface temperature of a single-faced cardboard sheet with a temperature sensor and controlling a cylinder via a temperature regulator and an electro-pneumatic converter in response to the detection signal, and thereby the surface temperature of the single-faced cardboard sheet can be maintained constant.

7 Claims, 4 Drawing Sheets

| P(Kg/5cm²) | t (sec) |
|---|---|
| 188.31 | 0.01950 |
| ~ | ~ |
| 115.47 | 0.2011 |

D1 = 2•D2

D1 = 3/2•D2
※: MESHING POINT d2 ~ D2. S0 < S M = 2(D-d)+H0
A NUMBER OF SIMULTANEOUSLY
MESHING TEETH.

SINGLE-FACER

BACKGROUND OF THE INVENTION

1. Field of the Invention

The present invention relates to a single-facer to be equipped in a corrugating machine, and more particularly to a sticking mechanism between a core paper web and liner, a pitch circle diameter ratio between upper and lower corrugating rolls, and regulation of a surface temperature of a single-faced corrugated cardboard sheet in the single-facer.

2. Description of the Prior Art

At first, description will be made on general constructions and operations of heretofore known single-facers with reference to FIGS. 6, 7, 8 and 9. FIGS. 6 and 7 illustrate general constructions of belt-pressing type single-facers in the prior art, and FIGS. 8 and 9 are schematic views showing meshing conditions between upper and lower corrugating rolls having the same pitch circle diameters in the prior art for explaining disadvantages of such single-facers in the prior art.

As shown in FIG. 6 or 7, in a belt-pressing type single-facer in the prior art, after paste was applied via a paste application roll 16 to crest portions of corrugations of a core paper web 3, which was corrugated into a wave-shape by passing through a gap between upper and lower corrugating rolls 1 and 2 meshed with each other, the core paper web 3 and a liner 5 fed through another route are joined together, and by applying a pressing force to the joined web and liner at a predetermined temperature, a single-faced corrugated cardboard sheet 6 is produced. As pressing means necessitated for sticking the above-mentioned raw paper webs (core paper web and liner paper web), a part of an endless belt 7 is brought into contact with the liner 5, and a pressing force is generated by means of only a tension of the belt 7. By the way, in the case of sticking the corrugated core paper web 3 with the liner 5 via the applied paste, as a necessary condition, besides the above-described proper temperature and pressing force, a predetermined pressing time is necessitated, and in order to achieve preferable sticking, among these temperature, pressing force and pressing time, there exists a correlating condition to be fulfilled. In other words, if the above-mentioned pressing force is increased, the pressing time can be shortened, and if the pressing time is extended, then the pressing force can be reduced. In addition, even if the paste is heated and its temperature is raised, also the pressing time can be shortened. To that end, a single-facer constructed in such manner that a part of the rolls wrapped with the endless belt 7 can be moved and thereby a tension of the belt as well as a wrapping angle $\theta$ of the belt around the corrugating roll can be arbitrarily varied, has been heretofore proposed.

A single-facer illustrated in FIG. 6 is constructed in such manner that a part 8*b* of a roll pair 8 having an endless belt 7 wound therearound can be moved in the tangential direction of the belt with respect to a downstream side corrugating roll 1, so that by appropriately regulating a hydraulic pressure (or pneumatic pressure) applied to a cylinder 12, a tension of the endless belt 7 can be controlled and thereby a pressing force generated between the belt 7 and the upper corrugating roll (downstream side roll) 1 having the belt 7 held in contact therewith can be regulated.

While, a single-facer illustrated in FIG. 7 is constructed in such manner that a part 8*b* of a roll pair 8 having an endless belt 7 wound therearound can be moved in the vertical direction via a cylinder 12, so that by varying relative positions between the roll 8*b* and the upper corrugating roll (downstream side roll) 1, a wrapping angle $\theta$ of the endless belt 7 around the above-mentioned corrugating roll 1 can be regulated.

However, in the single-facers illustrated in FIGS. 6 and 7, although regulation of a pressing force and a pressing time is possible, there still remained a shortcoming that there was no regulating means for maintaining a sticking force between corrugation crest portions of the core paper web and the liner constant, and so control was difficult.

Next, description will be made on shortcomings of the corrugating roll section in the single-face in the prior art. As illustrated in FIGS. 8 and 9, for the upper and lower corrugating rolls 1, 2 included in the heretofore known single-facers, generally corrugating rolls having their pitch circle diameters $d_1$, $d_2$; $D_1$, $D_2$ formed in the same size were combined, and therefore, speed-up of a manufacturing speed was structurally limited. More particularly, in the event that speed-up is contemplated by combining upper and lower corrugating rolls 1 and 2 having small diameters $d_1$, $d_2$ in the prior art as shown in FIG. 8, a press-pinching time becomes short, and so, there occurs the problem that sticking between the core paper web 3 and the liner becomes unreliable. Instead, if the diameters $D_1$, $D_2$ of the upper and lower corrugating rolls 1 and 2 are made large as shown in FIG. 9 in order to obviate the above-described shortcoming, then not only the entire apparatus becomes large-sized ($H_o<H$), but also a number of simultaneously meshing teeth increases ($S_o<S$), hence a tension applied to a core paper web 3 to be corrugated becomes large, and consequently, there occurs a disadvantage that the core paper web 3 would be torn. (The number of simultaneously meshing teeth is normally 3–4 teeth at the maximum.) As a counter-measure for resolving such problem in the prior art, while a single-facer of the heretofore known type but including a combination of corrugating rolls having different diameters, was manufactured, this single-facer did not have a construction (combination) taking a particular ratio of corrugating roll diameters into consideration, but it had a serious shortcoming that in the event that a tooth on the outer circumferential surface of a corrugating roll should be damaged due to biting of foreign matters or the like, that damage would be transferred to the entire circumference as a result of meshing of the corrugating rolls. In such single-facers of heretofore known type, various shortcomings were still left also in the corrugating roll section.

Although the single-facets illustrated in FIGS. 6 and 7 can regulate a pressing force via a belt and a wrapping angle (pressing time), respectively, as described above, regulator means for maintaining a sticking force between a corrugation crest portion of a core paper web and a liner constant, is not present, and so, it was not known to what extent a pressing force or a pressing time should be regulated for obtaining an optimum sticking force. Also, even if the pressing force regulating mechanism shown in FIG. 6 and the pressing time regulating mechanism shown in FIG. 7 were to be equipped in juxtaposition, it would be impossible to simultaneously regulate a pressing force and a pressing time, regulating ranges of a belt tension as well as a wrapping angle of an endless belt would become large, and control was very difficult. Besides, with regard to shortcomings of the corrugating roll section, since the upper and lower corrugating rolls are formed to have the same pitch circle diameter and combined, structurally it was impossible to employ large diameters, and hence, speed-up of a manufacturing speed could not be realized.

SUMMARY OF THE INVENTION

It is therefore one object of the present invention to provide an improved single-facer which is free from the above-described shortcomings of the single-facers in the prior art.

A more specific object of the present invention is to provide a single-facer which can achieve speed-up of a manufacturing speed of a corrugated cardboard sheet and yet can suppress propagation of a damage of a tooth of a corrugating roll to the other teeth when a foreign matter has been bitten between corrugating rolls.

Another object of the present invention is to provide a single-facer, in which an optimum sticking strength between a corrugation crest portion of a core paper web and a liner can be always realized even under variation of various manufacturing conditions such as specifications of a core paper web and a liner and manufacturing speeds.

The present invention has been worked out in order to resolve the above-described problems in the prior art and to achieve the aforementioned objects.

According to one feature of the present invention, there is provided a single-facer including a pair of corrugating rolls for corrugating a core paper web into a wave-shape, a paste application member for applying paste to corrugation crest portions of the corrugated core paper web, and an endless belt for pressing a liner against the core paper web applied with paste to stick them with each other, improved in that a pitch circle diameter of a downstream side corrugating roll is chosen larger than a pitch circle diameter of an upstream side corrugating roll, and a ratio of the same pitch circle diameters are chosen to be a predetermined integer ratio.

According to another feature of the present invention, there is provided the above-featured single-facer including a pair of corrugating rolls, a paste application member and an endless belt, which further includes a temperature sensor for detecting a surface temperature of a single-faced corrugated cardboard sheet, and regulator means responsive to a signal issued from the same temperature sensor for regulating at least either one of a pressing force of the same endless belt and a wrapping angle of the same endless belt so that the above-mentioned surface temperature may be always held at a predetermined value or higher.

According to the present invention, by enlarging a pitch circle diameter of a downstream side corrugating roll with respect to a pitch circle diameter of an upstream side corrugating roll, a sticking condition between a core paper web and a liner is improved, and so, speed-up of manufacture of corrugated cardboard sheets can be achieved. Moreover, since an upstream side corrugating roll can be formed to have a smaller diameter, a number of simultaneously meshing teeth can be limited to a predetermined number or less, and also a mounting space for a paste application roll and pressing means to be equipped at the circumference can be insured. In addition, even in the event that foreign matters such as bolts, nuts or the like have been between upstream side and downstream side corrugating rolls and the teeth of the both rolls have been damaged, owing to the fact that the combined corrugating rolls are formed so that a diameter ratio of the respective rolls may have a predetermined integer ratio, damages of the teeth are limited to only particular locations of the respective corrugating rolls, and propagation of the damages to the entire outer circumferences of the both corrugating rolls would not occur. (For instance, when it is assumed that a diameter ratio of the downstream side corrugating roll to the upstream side corrugating roll is 2:1, even if a foreign matter should be bitten between the respective rolls, damages would occur only at 2 locations on the downstream side corrugating roll and one location on the upstream side corrugating roll, and thus the locations of occurrence of damage are limited to minimum.) Consequently, a repair work can be carried out easily, and shortening of a repair time can be also achieved.

In addition, according to the present invention, owing to the fact that the single-facer is provided with a temperature sensor for detecting a surface temperature of a single-faced corrugated cardboard sheet, and regulator means responsive to a signal issued from the same temperature sensor for regulating at least either one of a pressing force of the above-mentioned endless belt and a wrapping angle of the same endless belt so that the above-mentioned surface temperature may be always held at a predetermined value or higher, a temperature of a single-faced corrugated cardboard sheet can be maintained constant depending upon specifications (paper quality, paper web thickness and the like) of the sheets to be stuck and manufacturing speeds. Accordingly, it has become possible to get always an optimum sticking strength even upon variation of various manufacturing conditions such as the above-described specifications of the sheets and manufacturing speeds.

The above-mentioned and other objects, features and advantages of the present invention will become more apparent by reference to the following description of preferred embodiments of the present invention taken in conjunction with the accompanying drawings.

DESCRIPTION OF THE PREFERRED EMBODIMENTS

Now, more detailed description will be made on a structure and operation of a single-facer (a belt-pressing type single-faced corrugated cardboard sheet manufacturing machine) according to one preferred embodiment of the present invention with reference to FIGS. 1 to 5.

Figure 1:
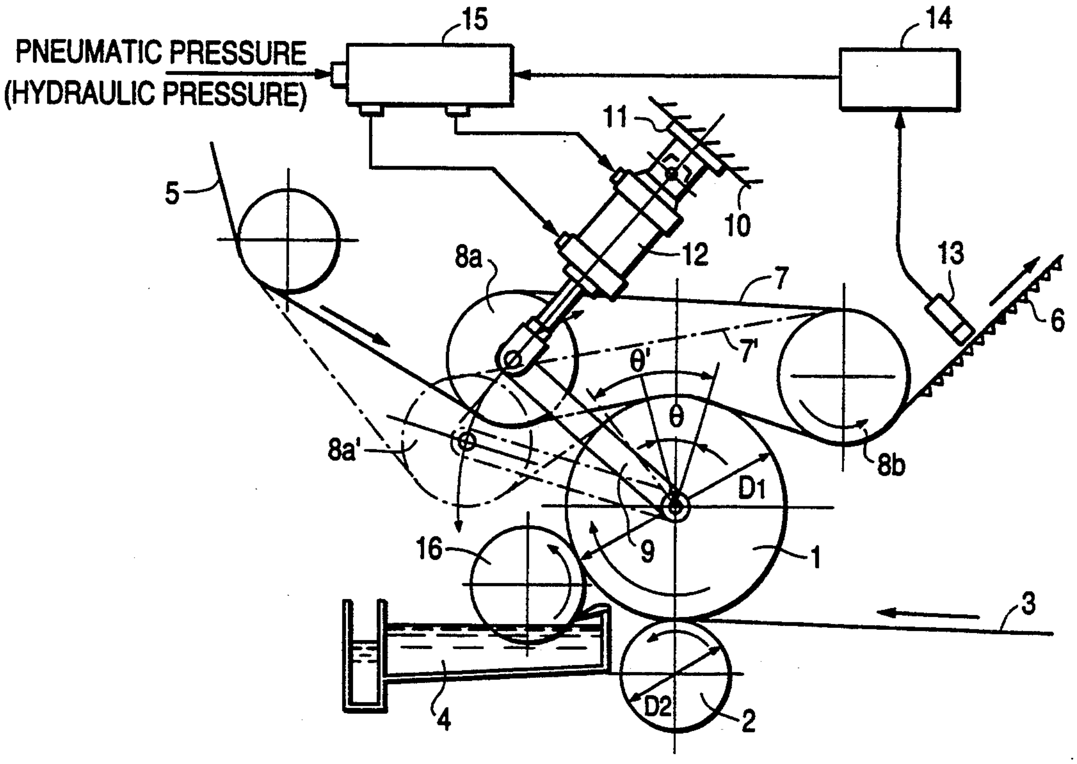
FIG. 1 is a schematic view partly in block form showing a general construction of a single-facer according to one preferred embodiment of the present invention.
Figure 2:
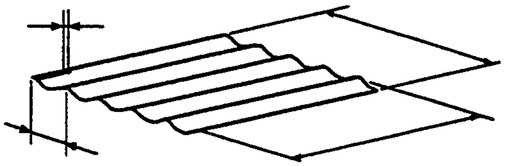
FIG. 2 is a perspective view showing a part of a corrugated core paper web.
Figures 3A, 3B:
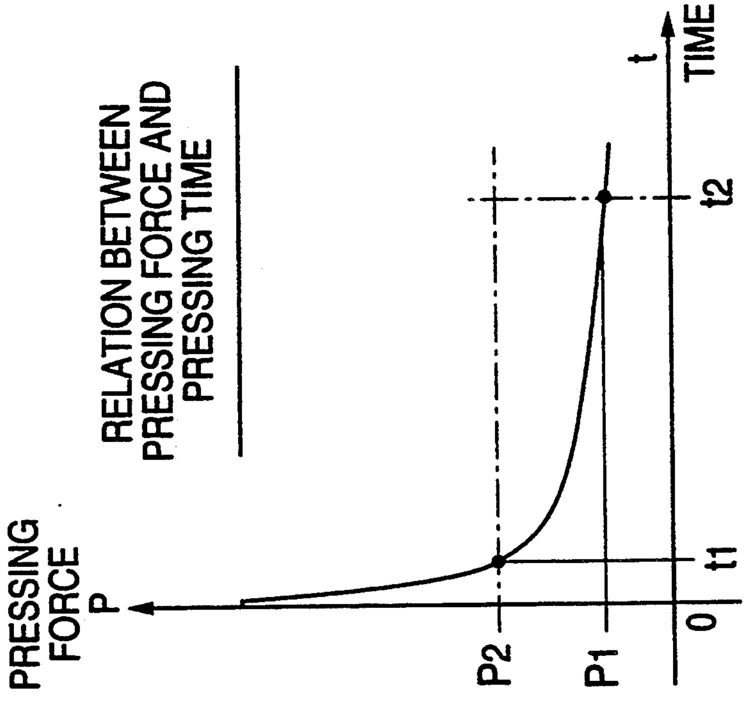
FIG. 3 shows a table and a diagram representing a relation between a pressing force and a pressing time for obtaining a given sticking force.

A basic function as a single-facer that a core paper web 3 is made to pass through a gap between a downstream side corrugating roll (an upper corrugating roll) 1 and an upstream side corrugating roll (a lower corrugating roll) 2 to be formed into a wave-shape, after paste 4 has been transferred to corrugation crest portions of the corrugated core paper web 3, it is joined with a liner 5 fed through another route, and then they are made to stick to each other by applying them a predetermined pressing force and appropriate heat for a predetermined time to be formed into a single-faced corrugated cardboard sheet 6 as shown in FIG. 1, is similar to that of the single-facer in the prior art described in the preceding section.

Now, in this preferred embodiment, one roll 8*b* of a roll pair 8 around which an endless belt 7 serving as pressing means is wound, is pivotably supported at a fixed position, and the other roll 8*a* of the same roll pair 8 is pivotably supported at a tip end portion of a link 9 which can swing about the axis of the downstream side upper corrugating roll 1. At the same time, the both axial ends of the same roll 8*a* are supported from a head portion of a cylinder 12 which is swingable mounted via a bracket 11 fixedly secured to a frame 10.

In FIG. 1, reference numeral 13 designates a temperature sensor, which is arranged in such manner that a measured temperature may be fed back via a temperature regulator 14 to an electro-pneumatic converter 15, so that after the temperature signal has been converted into a pneumatic pressure (or a hydraulic pressure), it may act upon the above-mentioned cylinder 12. The temperature sensor 13 is disposed on the side of a liner 5 of the single-faced corrugated cardboard sheet 6, and after a liner temperature of the single-faced corrugated cardboard sheet 6 has been measured by the same temperature sensor 13, the measured signal is transmitted to the temperature regulator 14. Subsequently, the temperature regulator 14 transmits a signal representing a deviation of the measured temperature from a preset temperature to the electro-pneumatic converter 15, and this electro-pneumatic converter 15 is adapted to feed a pneumatic pressure (or a hydraulic pressure) corresponding to the deviation signal to the cylinder 12.

Under the above-mentioned construction, in the event that the temperature on the side of the liner 5 of the single-faced corrugated cardboard sheet 6 is lower than the preset temperature, the roll 8*a* is moved in the direction shown by a single-dot chain line (in the direction for increasing a pressing force P and a pressing time t). However, in the event that the surface temperature of the liner 5 has become higher than the preset temperature, the roll 8*a* moves in a circular arc-shaped locus along the outer circumference of the downstream side corrugating roll 1 as guided by the link 9 connecting the shaft of the roll 8*a* and the shaft of the downstream side corrugating roll 1. Consequently, a tension as well as a wrapping angle around the downstream side corrugating roll of the endless belt can be varied, and so, both the pressing force P and the pressing time t can be simultaneously controlled.

Next, description will be made on a sticking strength (sticking condition) between the core paper web 3 and the liner 5 forming a single-faced corrugated cardboard sheet. Among the pressing force P, the pressing time t and an average temperature of paste (nearly corresponding to a liner temperature) $T_p$ which affect upon a sticking strength, there exists a correlation, and the following mathematical formula was derived through experiments:

$$F = 1.8 \times (3221P + 55744)\, e^{-\frac{3933.3}{(273+T_p)}} \cdot t^n$$

where

F: sticking strength (kg/5 cm²)

P: pressing force (kg/5 cm²)

$T_p$: average temperature of paste (°C.)

n: exponent of time term $$\begin{cases} 147.56P^{-1.235} & (P < 145.4) \\ 0.315 & (P \geqq 145.4) \end{cases}$$

t: pressing time (sec.)

The above-mentioned pressing time t is calculated by $$t = \pi \cdot D/\nu \cdot \frac{10^3}{60} \times \theta/360°,$$

where

D: downstream side corrugating roll diameter (mm)

$\theta$: wrapping angle of endless belt (degrees)

$\nu$: machine speed (traveling velocity of sheet) (m/min)

In this preferred embodiment, taking into account a machine structure and the like, as ranges of practical values the above-mentioned variables are limited to the following ranges:

D=332 mm−640 mm $\theta$=45°−120°

$\nu$=200 m/min−400 m/min

Under the above-mentioned conditions, in the case of D=332 mm, $\theta$=45° and $\nu$=400 m/min, a minimum pressing time $t_{min}$ is derived as follows:

$$t_{min} = \frac{\pi \times 332}{400 \times 10^3/60} \times \frac{45}{360} = 1.956 \times 10^{-2}(\text{sec}).$$

On the other hand, in the case of D=640 mm, $\theta$=120° and $\nu$=200 m/min, a maximum pressing time $t_{max}$ is derived as follows:

$$t_{max} = \frac{\pi \times 640}{260 \times 10^3/60} \times \frac{120}{360} = 2.011 \times 10^{-1}(\text{sec}).$$

Therefore, the range of a pressing time t becomes 0.01956–0.2011 (sec).

Now, explanation will be made of a pressing force P. If the above-described experimental formula for a sticking strength:

$$F = 1.8 \times (3221P + 55744)\, e^{-\frac{3933.3}{273+T_p}} \cdot t^n$$

is solved with respect P, the following formula is derived:

$$P = \frac{F}{1.8 \times 3221 \times e^{-\frac{3933.3}{273+T_p}} \cdot t^n} - \frac{55744}{3221}$$

As a minimum condition for the sticking strength F at the position just behind a downstream side separating point between the pressing belt and the downstream side corrugating roll, that is, at the moment just after a single-faced corrugated cardboard sheet has been delivered from the pressing section, in order that the sticking portion between the liner 5 and the core paper web 3 may not peel off due an elastic restoring action of the core paper web, the sticking strength F is necessitated to be F≧5 (kg/5 cm²).

Here, if $T_p$=80° C. and P<145.4 (kg/5 cm²) (100(kg/5 cm²)) are assumed, then $n = 147.56 \times 100^{-1.235} = 0.500$ is fulfilled, and in the case of $t_{max}$=0.2011 (sec), the minimum pressing force $P_{min}$ is calculated as follows:

$$P_{min} = \frac{5}{1.8 \times 3221 \times e^{-\frac{3933.3}{(273+80)}} \times 0.2011^{0.5}} - \frac{55744}{3221} = 115.47 \text{ (kg/5 cm}^2\text{)}.$$

While, if P≧145.4 (kg/5 cm²) is assumed, then n=0.315 is resulted, and in the case of $t_{min}$=0.01956 (sec), the maximum pressing force $P_{max}$ is calculated as follows:

$$P_{max} = \frac{5}{1.8 \times 3221 \times e^{-\frac{3933.3}{(273+80)}} \times 0.01956^{0.315}} - \frac{55744}{3221} = 188.31 \text{ (kg/5 cm}^2\text{)}.$$

Therefore, the range of a pressing force P becomes 115.47–188.31 (kg/5 cm²).

Under the above-described conditions, the pressing time t has an effective range of 0.01956 to 0.2011 (sec), and the pressing force P has an effective range of 115.47 to 188.31 (kg/5 cm²).

Accordingly, the operation pressure of the above-described cylinder 12 was preset so as to be controlled always within the above-mentioned range. Since the pressing force P and the pressing time t can be appropriately regulated in response to variation of the temperature of the liner 5 owing to the above-described capability, always the most preferable sticking force F can be realized (or maintained).

Figure 4:
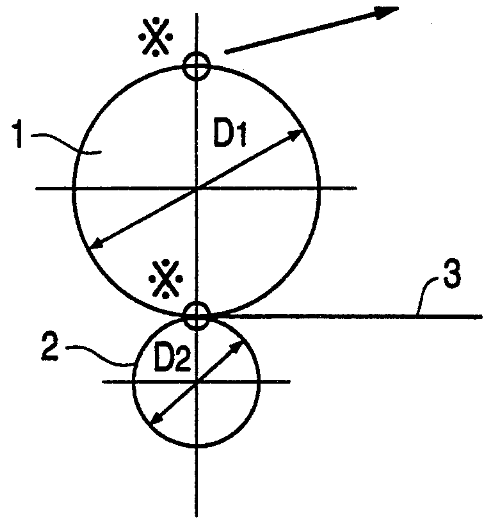
FIGS. 4 and 5 are schematic views showing two different combinations of corrugating rolls in a corrugating roll section of a single-facer according to two different preferred embodiments of the present invention.
Figure 5:
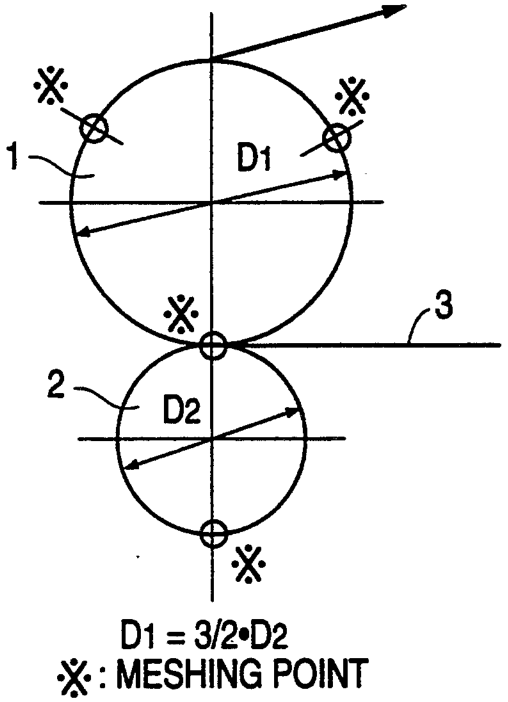
Figure 6:
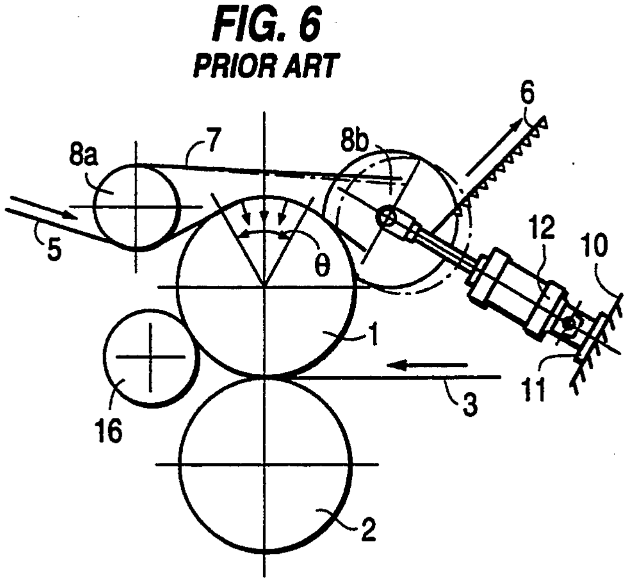
FIG. 6 PRIOR ART
FIG. 6 is a schematic view showing a general construction of a single-facer in the prior art, which is provided with an endless belt tension regulating mechanism.
Figure 8:
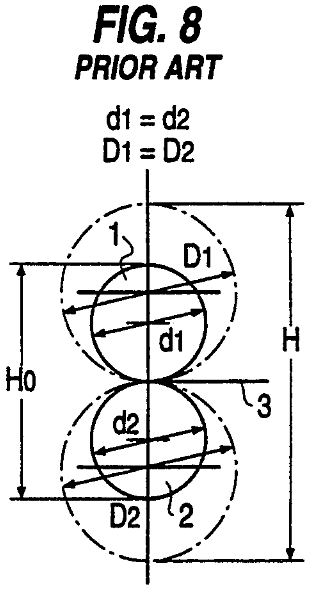
FIG. 8 PRIOR ART
FIGS. 8 and 9 are schematic views, respectively, illustrating disadvantages in operation of a corrugating roll section of a single-facer in the prior art.
Figure 7:
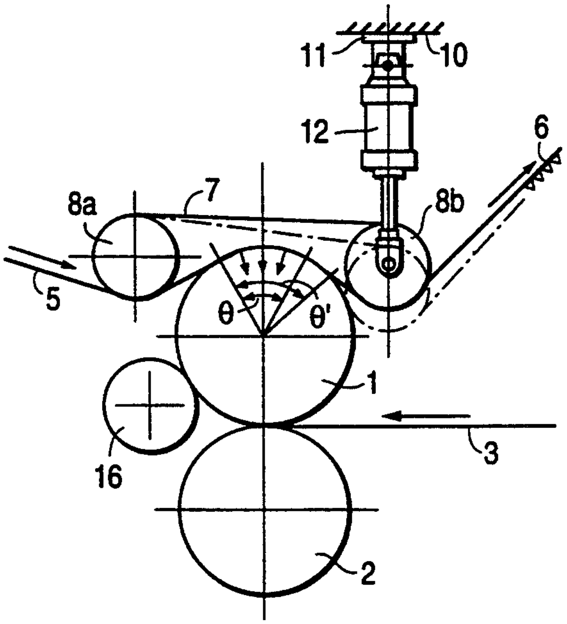
FIG. 7 PRIOR ART
FIG. 7 is a schematic view showing a general construction of another single-facer in the prior art, which is provided with an endless belt wrapping angle regulating mechanism.
Figure 9:
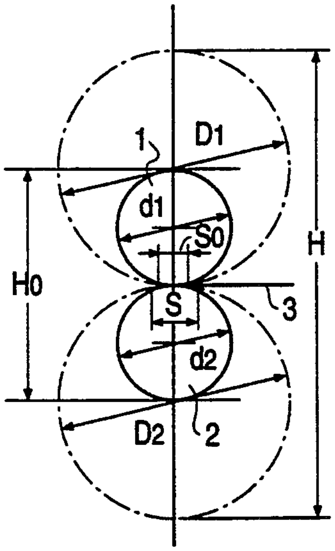
FIG. 9 PRIOR ART

Next, description will be made on a construction and an operation of a corrugating roll section equipped in the single-facer according to the illustrated embodiment of the present invention. The corrugating rolls in the single-facer according to this preferred embodiment is characterized in that among a downstream side corrugating roll 1 and an upstream side corrugating roll 2, the diameter of the downstream side corrugating roll 1 is made relatively larger than the diameter of the upstream side corrugating roll 2, thus a pair of corrugating rolls having different diameters are combined, and also a pitch circle diameter ratio or a ratio of numbers of teeth between the upstream side corrugating roll 2 and the downstream side corrugating roll 1 is chosen at a predetermined ratio as shown in FIGS. 4 and 5. As a result of the fact that the downstream side corrugating roll 1 was relatively large-sized in diameter, among the conditions necessitated at the time of sticking a core paper web 3 to a liner 5, that is, among a pressing force, a pressing time, a temperature for gelation of paste, improvements in a press-pinching time and a heating capability which would be lowered as a result of speed-up of a manufacturing speed, can be achieved, also a number of simultaneously meshing teeth of the upstream side and downstream side corrugating rolls 2 and 1 is increased, hence the shortcoming of the core paper web 3 being broken would be obviated, furthermore a space for disposing a paste application roll 16 or the like close to the sticking side (downstream side) corrugating roll 1 can be insured, and so, it has become possible to reduce the size of the entire apparatus.

By way of example, in the combination of corrugating rolls having different pitch circle diameters shown in FIG. 4, a ratio of pitch circle diameters $D_1$:$D_2$ or a ratio of numbers of teeth of the corrugating rolls 1 and 2 is chosen at 2:1, that is, the rolls are formed so as to fulfil the relation of $D_1 = 2\ D_2$. Even in the event that a foreign matter such as a bolt, a nut or the like should be bitten between these rolls 1 and 2, deformation or breaking of a corrugation tooth would occur only at two locations on the downstream side upper corrugating roll 1 and at one location on the upstream side lower corrugating roll 2 without propagating to the other locations. In other words, the shortcoming that a damage formed on one roll would be transferred onto a counterpart corrugating roll meshed with each other and would be propagated to the entire region of the corrugating rolls, is obviated.

In the other example illustrated in FIG. 5, a pitch diameter ratio of the downstream side corrugating roll 1 to the upstream side corrugating roll 2 was chosen at 3:2, that is, corrugating rolls having a relation of $D_1 = 3/2\ D_2$ were prepared and combined, and in this case, transferred damages would arise at 3 locations on the downstream side corrugating roll 1 and at 2 locations on the upstream side corrugating roll 2.

Besides the above-described preferred embodiments shown in FIGS. 4 and 5, as a pitch circle diameter ratio of the respective corrugating rolls 1 and 2, various ratios can be conceived, and if they are chosen among N:1 or M+L:M (N, M, L being integers equal to or larger than 1, N is an integer smaller than a number of teeth of the larger-diameter corrugating roll, and M+L is an integer smaller than a number of teeth of the larger-diameter corrugating roll), it would never occur that a damage propagates to the entire corrugating surface of the rolls. It is to be noted that in view of a small number of locations of propagated damages, rigidities of the respective corrugating rolls and an arrangement of instruments in the single-facer, practically it is preferable to select the above-mentioned pitch circle diameter ratio at 4:3, 3:2 or 2:1.

The single-facer according to the present invention is constructed as described above and operates in the above-described manner, and with regard to arrangement of the upper and lower corrugating rolls 1 and 2 and the like, the present invention should not be limited only to the above-described preferred embodiments, but various changes and modifications can be made to the illustrated arrangement without departing from the spirit of the present invention.

As will be seen from the detailed description of the preferred embodiments of the present invention above, according to the present invention, owing to the structural feature that in a single-racer including a pair of corrugating rolls for corrugating a core paper web into a wave-shape, a paste application member for applying paste to corrugation crest portions of the corrugated core paper web, and an endless belt for pressing a liner against the core paper web applied with paste to stick them with each other, a pitch circle diameter of a downstream side (sticking side) corrugating roll is chosen relatively large, and also a pitch circle diameter of an upstream side corrugating roll meshing with the former roll is chosen relatively small, a number of teeth simultaneously meshing with each other can be preset at a predetermined number or less to operate at a high speed, and moreover, a mounting space for a paste application device and the like can be insured at the circumference of the downstream side corrugating roll. In addition, owing to the fact that the corrugating rolls having a predetermined integer ratio of pitch circle diameters are combined, even if the teeth of the corrugating rolls should be damaged, for instance, if the teeth of the circumferential surfaces of the corrugating rolls should be deformed or broken due to a foreign matter such as a bolt, a nut or the like bitten between the corrugating rolls, meshing points therebetween would be always limited to a corresponding number of locations, the damage would not be transferred to other portions, and so, great shortening of a repair time can be achieved.

In addition, according to the present invention, owing to the structural feature that in a single-facer of the above-described type including a pair of corrugating rolls, a paste application member and an endless belt, there is provided regulating means for measuring a temperature of a single-faced corrugated cardboard sheet and varying pressing conditions (a pressing force and a pressing time) of the above-mentioned endless belt depending upon a deviation of the measured temperature from a preset temperature, a temperature of a single-faced corrugated cardboard sheet can be maintained constant depending upon specifications (paper sheet thickness and the like) and a manufacturing speed, and so, it has become possible to realize always an ideal sticking strength.

While a principle of the present invention has been described above in connection to preferred embodiments of the present invention, it is intended that all matter contained in the above description and illustrated in the accompanying drawings shall be interpreted to be illustrative and not in a limiting sense.

What is claimed is:

1. A single-facer comprising: a pair of corrugating rolls for corrugating a core paper web into a wave-shape; a paste application member for applying paste to corrugation crest portions of the corrugated core paper web; and an endless belt means for pressing a liner against the core paper web applied with paste to stick them with each other, said endless belt means being adjustable in both its pressing force and wrapping angle; wherein a pitch circle diameter of a downstream side (sticking side) corrugating roll is chosen larger than a pitch circle diameter of an upstream side corrugating roll, and a ratio of said pitch circle diameters are chosen to be a predetermined integer ratio.

2. A single-facer as claimed in claim 1, wherein a pitch circle diameter ratio (a ratio of numbers of teeth of corrugation) of the downstream side (sticking side) corrugating roll to the upstream side corrugating roll is selected from the group consisting of 2:1, 3:2 or 4:3.

3. A single-facer comprising: a pair of corrugating rolls for corrugating a core paper web into a wave shape; a paste application member for applying paste to corrugation crest portions of the corrugated core paper web; endless belt means for pressing a liner against the core paper web applied with paste to stick them with each other, the pressing force and wrapping angle of the endless belt means being controllable; a temperature sensor for detecting a surface temperature of a single-faced corrugated cardboard sheet; and regulator means responsive to a signal issued from said temperature sensor for regulating at least either one of a pressing force of said endless belt and a wrapping angle of said endless belt so that said surface temperature may be always held at a predetermined value or higher.

4. A single-facer as claimed in claim 3, wherein the sticking is effected while the pressing time of the endless belt is held in the range of 0.01956 sec. to 0.2011 sec. and the pressing force is held in the range of 115.47 (kg/5 $cm^2$) to 188.31 (kg/5$cm^2$).

5. A single-facer as claimed in claim 3, wherein a pitch circle diameter of a downstream side (sticking side) corrugating roll is chosen larger than a pitch circle diameter of an upstream side corrugating roll, and a ratio of said pitch circle diameters are chosen to be a predetermined integer ratio.

6. A single-facer as claimed in claim 5, wherein a pitch circle diameter ratio (a ratio of numbers of teeth of corrugation) of the downstream side (sticking side) corrugating roll to the upstream side corrugating roll is selected from the group consisting of 2:1, 3:2 or 4:3.

7. A single-facer as claimed in claim 4, wherein a pitch circle diameter ratio (a ratio of numbers of teeth of corrugation ) of the downstream side (sticking side) corrugating roll to the upstream side corrugating roll is selected from the group consisting of 2:1, 3:2 or 4:3.

* * * * *